US008986766B2

(12) United States Patent
Bernhardsgruetter et al.

(10) Patent No.: US 8,986,766 B2
(45) Date of Patent: Mar. 24, 2015

(54) MIXING AND DISPENSING APPARATUS WITH MOVABLE MIXING CHAMBER

(75) Inventors: Raphael Bernhardsgruetter, St. Gallen (CH); Cedric Beausire, Bavois (CH); Lucio Scorrano, Yverdon-les-Bains (CH)

(73) Assignee: Nestec S.A., Vevey (CH)

( * ) Notice: Subject to any disclaimer, the term of this patent is extended or adjusted under 35 U.S.C. 154(b) by 443 days.

(21) Appl. No.: 12/994,525

(22) PCT Filed: May 29, 2009

(86) PCT No.: PCT/EP2009/056587
§ 371 (c)(1),
(2), (4) Date: Jan. 12, 2011

(87) PCT Pub. No.: WO2009/153157
PCT Pub. Date: Dec. 23, 2009

(65) Prior Publication Data
US 2012/0009318 A1    Jan. 12, 2012

(30) Foreign Application Priority Data
May 29, 2008   (EP) .................................... 08157211

(51) Int. Cl.
| | |
|---|---|
| A23L 2/00 | (2006.01) |
| B67D 7/16 | (2010.01) |
| A47J 31/40 | (2006.01) |
| A47J 31/36 | (2006.01) |

(52) U.S. Cl.
CPC ............ *A47J 31/3614* (2013.01); *A47J 31/401* (2013.01)
USPC ................ 426/474; 426/518; 222/71; 99/295

(58) Field of Classification Search
USPC .................... 426/474, 518; 99/495; 222/71
See application file for complete search history.

(56) References Cited

U.S. PATENT DOCUMENTS

| | | | |
|---|---|---|---|
| 3,537,383 A | | 11/1970 | Gianfranco |
| 3,976,575 A | * | 8/1976 | Sullins .......................... 210/220 |
| 5,103,716 A | * | 4/1992 | Mikkelsen ................... 99/289 R |
| 5,197,372 A | * | 3/1993 | Schneeberger ................. 99/287 |
| 2004/0071841 A1 | * | 4/2004 | Carhuff et al. ................. 426/250 |
| 2004/0118871 A1 | | 6/2004 | Coronado et al. |
| 2005/0095341 A1 | | 5/2005 | Sher et al. |
| 2009/0188395 A1 | * | 7/2009 | Sala et al. .................... 99/289 R |
| 2009/0232954 A1 | * | 9/2009 | Imison .......................... 426/569 |
| 2010/0173057 A1 | * | 7/2010 | Gugerli et al. ................. 426/474 |
| 2011/0076371 A1 | * | 3/2011 | Deolarte et al. .............. 426/433 |
| 2011/0081464 A1 | * | 4/2011 | Gugerli et al. ................. 426/231 |

FOREIGN PATENT DOCUMENTS

| | | |
|---|---|---|
| DE | 1903859 | 9/1969 |
| EP | 0370936 | 5/1990 |
| EP | 0419398 | 3/1991 |
| EP | 0468915 | 1/1992 |
| EP | 1702544 | 9/2006 |
| FR | 2504379 | 10/1982 |

OTHER PUBLICATIONS

PCT International Search Report for Application No. PCT/EP2009/056587 with an International Filing Date of May 29, 2009, with a Mailing Date of Nov. 5, 2009, 6 Pages.

* cited by examiner

*Primary Examiner* — Alicia Chevalier
*Assistant Examiner* — Bhaskar Mukhopadhyay
(74) *Attorney, Agent, or Firm* — K&L Gates LLP (57) ABSTRACT

The present invention relates to a beverage mixing and dispersing apparatus comprising: —a metering device, —a mixing chamber, —at least one diluent feeding means, —means for moving the mixing chamber, characterized in that the mixing chamber is movable between: —a metering position, where the metering device outlet emerges in the mixing chamber inlet, and —a mixing position, where the diluent feeding means are able to inject the diluent in the mixing chamber and the metering device outlet does not emerge in the mixing chamber inlet.

18 Claims, 5 Drawing Sheets

MIXING AND DISPENSING APPARATUS WITH MOVABLE MIXING CHAMBER

The present invention relates to an apparatus for mixing and dispensing beverage, especially food beverages, implementing a mixing dissolution chamber that is movable inside the apparatus. The invention further relates to a method for producing beverages in a mixing and dispensing apparatus comprising the step of moving the mixing chamber during the preparation.

Beverage production apparatuses exist for producing beverage liquids that utilize a diluent for dissolving a soluble ingredient such as coffee powder. A first type of systems proposes to dissolve the ingredients directly inside the beverage cup. According to certain of this first type of systems, means move the cup successively at different positions to receive the different soluble ingredients and finally the diluent. These systems are designed for important production of beverages out of home and the mixing of the soluble ingredients directly inside the cup does not provide the better mixing dissolution, especially when froth is desired on the top of the beverage.

A second type of systems proposes to dissolve the ingredients in a mixing chamber, which delivers then the beverage in a cup placed at the outlet of the mixing chamber. This second type of systems enables a proper dissolution of the powder and can produce a satisfying amount of froth on the top of the beverage. Mixing chambers can be implemented either in out of home or in home beverage production apparatuses.

US 2004/0118871 describes an apparatus for preparing and dispensing beverages according to the above second type of systems. The mixing chamber of this apparatus can be moved from a working position in which the filling opening of the mixing chamber is covered by an extract container into a feed position in which the filling opening of the mixing chamber is freely exposed for manual feeding of drink additives. In the feed position, additives are added in the mixing chamber by manual feeding and in the working position, usual soluble ingredients fall from a metering device insides the mixing chamber, hot water is added and the rotor of the mixing chamber is set in action to prepare the beverage. The beverage is then delivered through the outlet of the mixing chamber. This apparatus presents one of the disadvantages of most of the apparatuses that include a mixing chamber: the steam generated by the hot water during the mixing operation rises up the mixing chamber and to the metering device. When the apparatus is used several times in succession, hot steam originating from the mixing chamber can rise and moisten the discharge port of the metering device during the time period when this device is opened toward the mixing chamber to introduce the soluble ingredients. After a period of time, this process can lead to an accumulation of moisture on the discharge port. As a result, the soluble ingredient being discharged adheres to this moisture on the discharge port. As the quantity of soluble ingredient accumulating on discharge port increases over time, the discharge port becomes increasingly constricted. Ultimately, this can result in the discharge port becoming completely clogged, which results in the complete failure of the metering device. Additionally, the soluble ingredient adhering to the discharge port is constantly moistened by the rising steam. This can result in the soluble ingredient caking and even turning mouldy or growing harmful bacteria after extended use. This may lead to the metering device rendering the soluble ingredient inconsumable.

Besides, this type of apparatus does not enable the frothing of milk alone, for example for the preparation of a cappuccino, except by adding a second hot water nozzle dedicated to that operation in the apparatus.

There is a need for a beverage preparation apparatus that utilizes a diluent for dissolving a soluble ingredient in a mixing chamber avoiding the above problem of steam introduction in the metering device. There is also a need for such a type of apparatus enabling the preparation either of a coffee or a cappuccino in a simple way.

In a first aspect, the invention relates to a beverage mixing and dispensing apparatus comprising:
a metering device,
a mixing chamber presenting at least an upward wall and a bottom wall, said bottom wall comprising a beverage outlet,
diluent feeding means,
means for moving the mixing chamber,
where the mixing chamber is movable between:
a metering position, where the metering device outlet emerges in the mixing chamber inlet, and
a mixing position, where the diluent feeding means are able to inject the diluent in the mixing chamber and the metering device outlet does not emerge in the mixing chamber inlet.

The apparatus of the present invention comprises a metering device of which function is to take off metered doses from a soluble ingredient tank to feed the mixing chamber of the apparatus. The metering device comprises dosing means which can be of any known types like a screw, an auger, a barrel, a sliding chamber, a rotary pierced disc, . . . for delivering a dose of powder to the mixing chamber of the apparatus. The outlet of the metering device is directed to or cooperates with the mixing chamber inlet—e.g. through a pipe—when the latter is in the metering position.

As the mixing chamber of the apparatus is conceived for the dissolution of soluble ingredients in a diluent, it presents at least an upward wall and a bottom wall with a beverage outlet in the bottom of the mixing chamber. In its simpler form the mixing chamber is a container with a bottom outlet. Such a chamber provides the function of a container that can receive simultaneously a soluble ingredient and a diluent so that by contact the soluble ingredient dissolves in the diluent and also the function of emptying the chamber by delivering the beverage issued from the dissolution of the soluble ingredient through an outlet by gravity fall.

The mixing chamber can take various shapes. In a preferred mode, the upward wall is substantially cylindrical. Other shapes could be envisaged such as a polygonal, e.g., hexagonal, or oval section of the chamber, for instance. The bottom wall can be substantially a portion of truncated cone. This shape enables to improve the distribution of liquid in a layer which rises along the upward wall of the chamber as a result of the centrifugal effect on the liquid, imparted by the diluent jet. The mixing chamber usually comprises an inlet opening for the introduction of soluble ingredient and of the diluent. Usually, the inlet of the mixing chamber is on the top of the chamber so that soluble ingredient can be introduced by gravimetric fall inside the mixing chamber. According to the main feature of the present invention, the mixing chamber of the apparatus can move between two positions. The movement between these two positions concerns the whole of the mixing chamber elements that are the upward wall, the bottom wall and the outlet. The mixing chamber moves backwards and forwards between these two positions each time a beverage is prepared. In the first metering position, the place of the mixing chamber is such that the metering device outlet emerges in or cooperates with the mixing chamber inlet for example by the means of a pipe or a funnel. In the second mixing position, the diluent feeding means are able to inject the diluent in the mixing chamber and the metering device outlet does not emerge anymore in the mixing chamber inlet. These two positions of the mixing chamber are sufficiently distant so that it is not possible to have the metering device outlet emerging in the mixing chamber while the diluent feed means feed diluent in the mixing chamber: either, in one position, the metering device outlet emerges in the mixing chamber and no diluent can be fed in the mixing chamber or, in a second position, the metering device outlet does not emerge in the mixing chamber and the diluent can be fed in the mixing chamber. Due to this configuration, when the diluent is introduced in the mixing chamber, the generated steam does not rise in the metering device and the drawbacks of the state of the art are avoided. Generally in the metering position, the mixing chamber inlet opening is below the metering device because it is advantageous to take profit of the gravity force to let soluble ingredient falls in the mixing chamber, yet any other introduction of soluble ingredient in other sides of the mixing chamber for example in a side opening is possible. In the same way, in the mixing position, the mixing chamber inlet opening is generally below the diluent feed opening because it is preferable to take profit of the gravity force to let diluent falls in the mixing chamber, yet any other introduction of diluent in other sides of the mixing chamber for example in a side opening is possible.

Preferably, the mixing chamber is linearly translatable between the metering position and the mixing position. The metering device and the mixing chamber can be controlled by the same motor. According to the preferred embodiment of the apparatus, the metering device comprises a rotating disc and the mixing chamber is linked to said rotating disc by a connecting rod. This connecting rod enables the linearly translation of the mixing chamber in connection with the rotating movement of the disc of the metering device. The connecting rod is connected to the rotating disc so that when the mixing chamber is in the metering position, the rotary disc is in the angular position where its pierced hole is placed above the mixing chamber and so that when the mixing chamber leaves the metering position, the rotary disc is in the angular position where its pierced hole is closed. Yet the invention is not limited to these means for moving the chamber. Said chamber can also be moved by supporting the mixing chamber by rails and moving the rails by the means of a driving toothed wheel or by fixing the chamber on accordion type scissors.

The movement of the chamber from the metering to the mixing position can also be a combination of several translations, for example a horizontal translation and then an upward vertical translation, which would even more avoid the presence of steam or humidity around the metering position.

Preferably the mixing chamber is rotor free.

According to a specific embodiment of the present invention, the mixing chamber is detachable from the mixing and dispensing apparatus once the mixing chamber is in the mixing position. It is advantageous for cleaning purposes. It also enables the use of different types of mixing chambers according to the type of ingredient that is dissolved or the type of beverage (foam or no foam) the customer wants to obtain. The mixing chamber can be supported by a slider in which the chamber is able to slide and to be anchored and the slider is connected to the means for moving the chamber.

Preferably the apparatus of the present invention comprises means for closing the mixing chamber to the atmosphere in the mixing position. These means can consist in a cover eventually pierced by the diluent feeding means. The combination of the cover on the mixing chamber opening and the introduction of the diluent can be sufficient to create a depression in the chamber helping in the frothing of the beverage if required. In such a case, it is useful that the mixing chamber can be movable to a third release position, where the means for closing the mixing chamber are dissociated from the mixing chamber. In this position that is different from the mixing and the metering positions, the mixing chamber is opened to the atmosphere. Then the beverage issued from the mixing inside the mixing chamber can freely flow down and out of the mixing chamber due to the pressure equilibrium between the mixing chamber and the atmosphere.

According to a first mode, the mixing chamber can be moved between:

a metering position, where the diluent feeding means do not emerge in the mixing chamber inlet, and a mixing position, where the diluent feeding means emerge in the mixing chamber inlet.

In this first mode, the diluent feeding means and the metering means are mainly immobilized and only the mixing chamber is able to move between them. The different positions of the mixing chamber are realised by the movement of the mixing chamber relative to the metering device and to the feeding means. The mixing chamber can be placed in the metering position at a remote position from the feeding means: in this position, the metering device outlet emerges in or cooperates with the mixing chamber inlet—e.g. through a pipe—and the diluent feeding means do not emerge in the mixing chamber inlet. And the mixing chamber can be placed in the mixing position at a remote position from the metering means and near from the feeding means: in this position, the diluent feeding means emerge in or cooperate with the mixing chamber inlet for example through a pipe. The feeding means can move to provide a tight cooperation with the mixing chamber when the latter is in the mixing position for example through a substantial vertical translation of the feeding means down to the mixing chamber.

According to a specific implementation of this first mode, the apparatus can comprise means for closing the mixing chamber to the atmosphere in the mixing position, where these means consist in a cover pierced by the diluent feeding means, for example a pipe.

According to another implementation of this first mode, the mixing chamber can comprise a channel for guiding the diluent to a chamber inlet placed in the upward wall of the mixing chamber. This channel generally runs from the top of the mixing chamber along the external wall of the mixing chamber and ends in the upward wall of the mixing chamber. Such a channel enables the control of the orientation and the size of the diluent jet entering inside the mixing chamber.

In this first mode, the mixing chamber can comprise at least a sieve facing the diluent inlet in the mixing position. This sieve aims at creating shearing forces to produce foam on the top of the beverage, especially crema in the case of production of coffee. This sieve is preferably horizontally oriented when the diluent is introduced through the top opened extremity of the mixing chamber.

In this first mode, the mixing chamber can be moved to at least one diluent delivery position where neither the diluent feeding means nor the metering device outlet emerges in the mixing chamber inlet. In this fourth position, the mixing chamber inlet faces neither the diluent feeding means nor the metering device outlet. The diluent delivery position is different from the metering position and the mixing position. Then the feeding means can be used to deliver the diluent in a recipient placed under the feeding means. This position is useful for example for foaming a product, like a milk-based product, placed inside a recipient before a beverage is delivered in the same recipient by the mixing chamber, which is the case for producing cappuccino type beverages. This position can also be used to dilute any type of concentrated ingredient present in a recipient by adding a diluent: it can be interesting for producing a beverage by dilution of an ingredient different from the ingredient stored and metered by the metering means. When the mixing chamber moves between the mixing and the metering position through a translation movement, the diluent delivery position can be a position intermediate between the two former positions. There the diluent feeding means can directly deliver the diluent in a recipient placed under while the mixing chamber stays away from the metering position which prevents the opening of the metering dosing means during this operation delivering diluent; then it avoids the introduction of humidity inside said metering device.

According to a variant of the first mode, the mixing chamber can comprise an extension plate on its external wall, said plate being pierced by at least a hole and said hole facing the diluent feeding means in a frothing position. The extension plate can comprise several holes presenting different sections in order to control the force of the diluent jet ejected by said holes. Smaller is the size of the hole, stronger is the force of the jet of diluent ejected from. Then, the apparatus of the present invention can present different diluent delivery positions according to the position of the mixing chamber and consequently of the holes relative to the diluent feeding means. If the mixing chamber moves according to a translation during its movement between the metering and the mixing positions, the extension plate can be oriented along the axis of said translation and the different holes can be placed along this axis so that the translation movement enables the feeding means to face successively the mixing chamber inlet—that is either its top opened extremity or its channel for guiding the diluent to a chamber inlet placed in an upward wall of the mixing chamber—and then each of the holes for feeding diluent to a recipient placed under. The extension plate can also be oriented radially around the mixing chamber top opened extremity. Means can be provided for rotating the chamber around its central axis in order to chose to have the feeding means facing a specific hole size or even the inlet of the channel for guiding the diluent to a chamber inlet placed in an upward wall of the mixing chamber placed.

According to a second mode, the mixing chamber can comprise:
  a transverse bottom wall and a longitudinal upward wall,
  at least one diluent inlet provided through the upward wall.

In such a second mode, the diluent means are directly connected to the mixing chamber and forms part of it. Then just as the mixing chamber, the diluent feeding means are movable too and are displaced according to the movement of the mixing chamber. In the metering position, where the metering device outlet emerges in the mixing chamber inlet, the diluent feeding means are in a closed state so that diluent cannot emerge from the diluent feeding means. In the mixing position, the diluent feeding means are in an opened state and are able to inject the diluent in the mixing chamber.

In this second mode, the mixing chamber can comprise at least a sieve facing the diluent inlet. Preferably, the sieve is vertically oriented.

In this second mode, the apparatus can comprise:
  a first diluent delivery line connected to the upward wall of the mixing chamber,
  a second diluent delivery line comprising a nozzle directed toward the area of a receptacle for delivering a diluent volume to the receptacle. The first delivery line corresponds to the diluent inlet provided through the upward wall of the mixing chamber and aims at providing diluent for dissolving the powder ingredient in the mixing chamber. The second diluent delivery line aims at providing diluent directly inside a receptacle for frothing a substance placed in the cup or for only providing diluent to the receptacle independently of the mixing chamber.

In a second aspect, the invention concerns a method for producing a liquid beverage in a mixing and dispensing apparatus comprising at least the following steps:
  providing a mixing chamber in a first position,
  in said first position, feeding the mixing chamber with soluble ingredient by the means of at least one metering device cooperating with a soluble ingredient source,
  moving the mixing chamber away from any metering device in a second position,
  in said second position:
  feeding a diluent in the mixing chamber to mix the diluent with said soluble ingredient and dissolve said soluble ingredient into a liquid beverage, and
  draining the liquid beverage from the mixing chamber.

In the second position, further to the draining of the liquid beverage, the mixing chamber is empty and ready to start a new cycle.

Preferably the chamber is linearly translated away from the metering position.

It is also preferable to close the mixing chamber inlet to the atmosphere during the feeding of diluent inside the mixing chamber.

The invention also concerns a method for producing a frothed beverage with the apparatus according to the above described first mode, said method comprising at least the following steps:
  moving the mixing chamber to the diluent delivery position,
  placing a receptacle comprising at least a foamable ingredient under the diluent feeding means,
  feeding a diluent through the diluent feeding means in the receptacle to foam the foamable ingredient.

This method enables the production of beverages like cappuccino type of beverage where a milk product is first frothed inside a receptacle and then a coffee beverage is added to the frothed milk product. Usually the foamable ingredient is liquid milk.

The method can comprise the following added steps:
  moving the mixing chamber to the metering position and feeding the mixing chamber with soluble ingredient delivered by the metering device,
  moving the mixing chamber to the mixing position and feeding the diluent in the mixing chamber to mix the diluent with said soluble ingredient and dissolve said soluble ingredient to form a liquid beverage,
  stopping the diluent intake inside the mixing chamber and draining the liquid beverage from the mixing chamber into the receptacle containing the foamed foamable ingredient.

These added steps enable the production of mixture of a frothed beverage and of the beverage issued from the dissolution, and eventually the frothing of soluble ingredients.

The invention concerns too a method for producing a frothed beverage with an apparatus according to the second above described mode, comprising:
  moving the mixing chamber to an intermediate position between the metering and the mixing position,
  placing a receptacle comprising at least a foamable ingredient under the mixing position of the mixing chamber and under the nozzle of the second diluent delivery line,
  feeding a diluent through the nozzle of the second diluent delivery line in the receptacle to foam the foamable ingredient.

The method can comprise the following added steps:

moving the mixing chamber to the metering position and feeding the mixing chamber with soluble ingredient delivered by the metering device, moving the mixing chamber to the mixing position and feeding the diluent in the mixing chamber to mix the diluent with said soluble ingredient and dissolve said soluble ingredient into a liquid beverage, stopping the diluent intake inside the mixing chamber and draining the liquid beverage from the mixing chamber into the receptacle containing the foamed foamable ingredient.

According to the invention, the diluent can be any suitable liquid adapted for dissolving a food soluble ingredient using the features and conditions of the device. A preferred diluent is hot water but other diluents such as cold water or other aqueous liquids can be utilized such as liquid milk.

The soluble ingredient can be any foamable food ingredient that dissolves and performs to produce a beverage using the features and conditions of the apparatus of the invention. A preferred ingredient is soluble coffee powder. However, other ingredients can be used in the device of the invention to provide liquid such as liquid concentrates, chocolate powder, soluble tea, dehydrated culinary ingredients like soup and/or milk based ingredients.

The characteristics and advantages of the invention will be better understood in relation to the figures which follow.

Figure 1A:
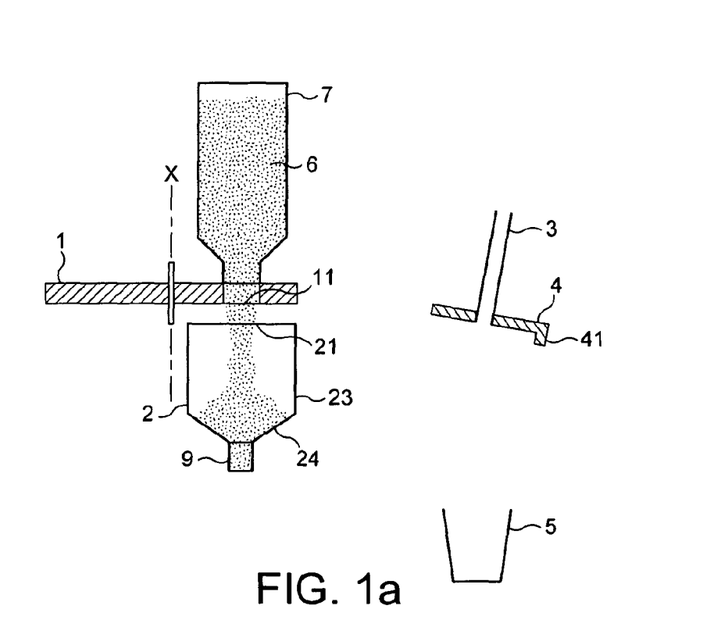
FIGS. 1a to 1d illustrate the first mode of the beverage mixing and dispensing apparatus of the present invention.
Figure 1B:
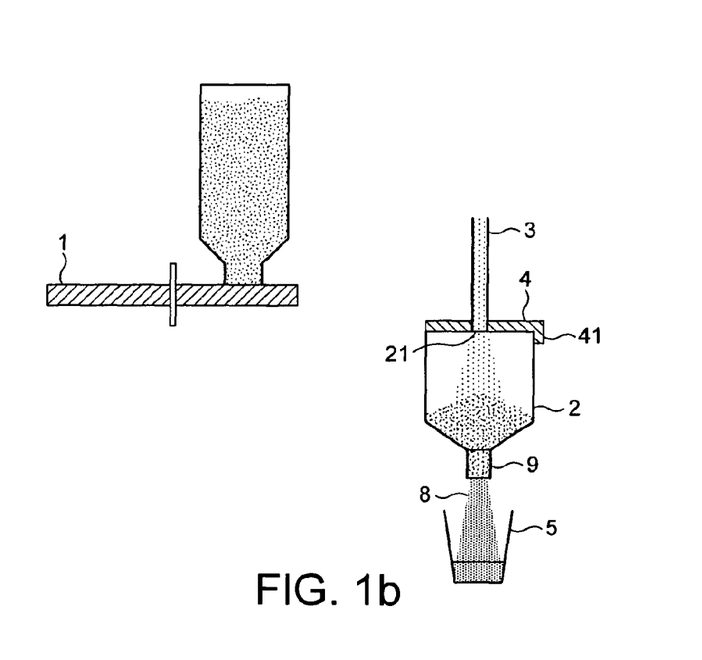
Figure 1C:
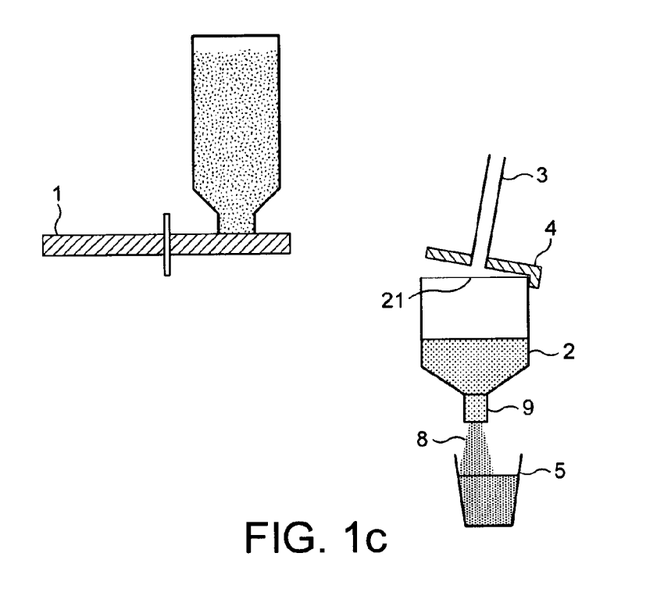
Figure 1D:
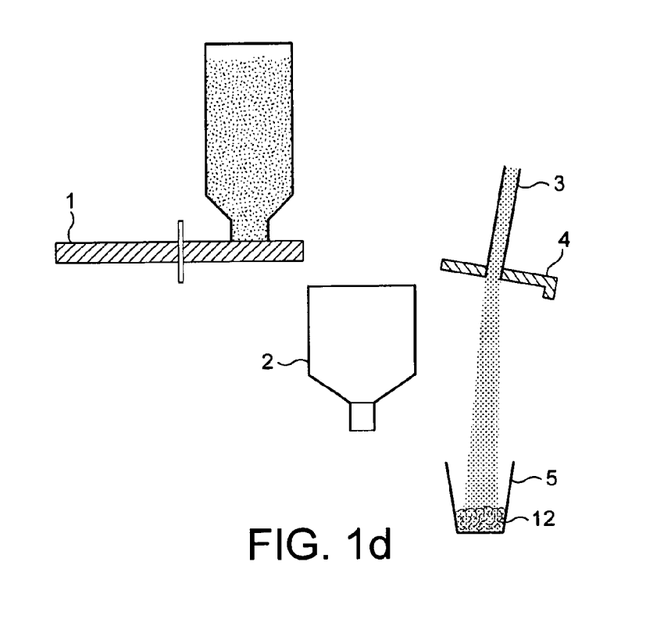

FIG. 1a illustrates the first mode of the beverage mixing and dispensing apparatus of the present invention where the mixing chamber is placed in the metering position. The apparatus comprises a metering device 1 consisting in a disc pierced by a whole corresponding to the metering device outlet 11. The disc is able to turn around its central axis X so that the hole 11 can transfer a dose of soluble ingredient 6 stored in a tank 7 to the mixing chamber 2 through the mixing chamber inlet 21 placed under the hole 11. The mixing chamber comprises an upward wall 23 and a bottom wall 24 forming both a container and an outlet 9 in the bottom wall. FIG. 1b represents the same beverage mixing and dispensing apparatus in the mixing position: the mixing chamber has been moved by means for moving the chamber (not represented) away from the metering position of FIG. 1a to the position of FIG. 1b where the mixing chamber inlet 21 is closed by a cover pierced by the diluent feeding means 3 like a tube or a nozzle. The cover 3 presents a lip 41 against which the mixing chamber wall lean on when it moves to the mixing position so that it forces the cover to well closed the chamber inlet. In this position, diluent is injected though the diluent feeding means 3 inside the mixing chamber 2 where diluent mixes with soluble ingredient present inside to provide a beverage 8 that begins to flow from the mixing chamber outlet 9 into a cup 5. Since the diluent feeding means 3 are placed away from the metering device, there is no risk that steam and moisture above generated in the mixing chamber may raise inside the metering device. In FIG. 1c, feeding of diluent has been stopped. The mixing chamber is in the delivery position: it has been slightly moved away and back from the mixing position so that the chamber wall does not lean anymore on the lip 41 of the cover 4; then the cover 4 half-opens the mixing chamber inlet 21, the pressure inside the mixing chamber becomes the same as the atmosphere and the mixed beverage can rapidly falls inside the cup 5. It is possible to rinse the mixing chamber with a jet of water before the mixing chamber comes back to its dosing position. FIG. 1d illustrates the apparatus when the mixing chamber is in the frothing position. This position corresponds to the optional step where the customer wants to prepare a beverage that is a mixture of a frothed liquid and of a beverage prepared by dilution of a soluble ingredient according to previous FIGS. 1a to 1c, like a cappuccino-type beverage issued from the successive flows of a frothed milk based product and of a coffee inside the final recipient. According to FIG. 1d, it is possible to froth a product 12 placed by the customer in the cup 5. This product 12 can be a liquid like fresh milk or a concentrate like a milk powder. The mixing chamber 2 is placed in a position that is intermediate between the metering position and the mixing position, consequently, the mixing chamber does not hire the diluent feeding means 3 and these means are able to deliver a jet of diluent directly in the cup 5 placed under them for frothing the product 12.

Figure 2A:
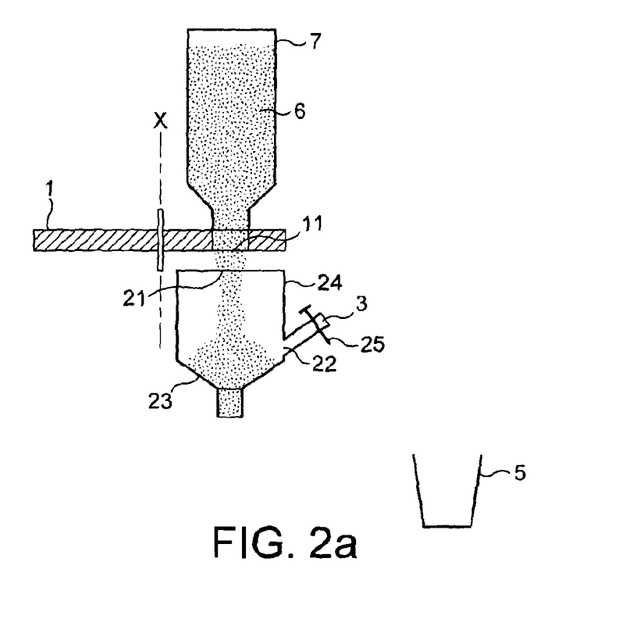
FIGS. 2a and 2b illustrate the second mode of the beverage mixing and dispensing apparatus of the present invention.
Figure 2B:
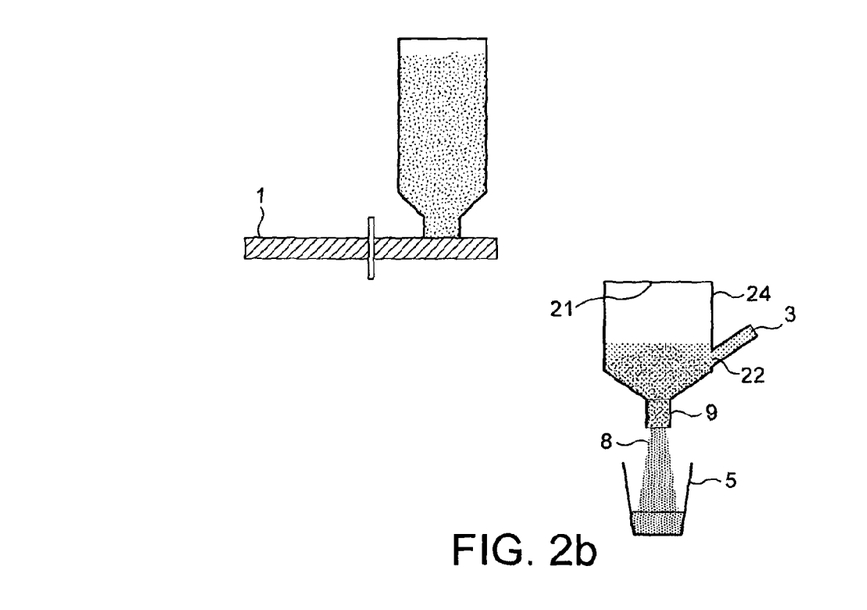

FIG. 2a illustrates the second mode of the beverage mixing and dispensing apparatus of the present invention placed in the metering position. The apparatus comprises a metering device 1 consisting in a disc pierced by a whole corresponding to the metering device outlet 11. The disc is able to turn around its central axis X so that the hole 11 can transfer a dose of soluble ingredient 6 stored in a tank 7 to the mixing chamber 2 through the mixing chamber inlet 21 placed under the hole 11. The mixing chamber presents a transverse bottom wall 23, a longitudinal upward wall 24 and at least one diluent inlet 22 provided through the upward wall 24. The diluent feeding means are linked to the diluent inlet 22 but no diluent is able to flow through the diluent inlet 22 because the diluent feeding means 3 are not able to work when the mixing chamber is placed near from the metering device. This function can be obtained for example by placing a valve 25 for stopping the introduction of diluent when the mixing chamber is in the metering position. FIG. 2b represents the same beverage mixing and dispensing apparatus in the mixing position: the mixing chamber has been moved by means for moving the chamber (not represented) away from the metering position of FIG. 2a to the position of FIG. 2b where the mixing chamber inlet 21 is closed by a cover 4. In this position, diluent is injected though the diluent feeding means 3 inside the mixing chamber 2 through the diluent inlet 22. In the mixing chamber, the diluent mixes with soluble ingredient present inside to provide a beverage 8 that flows from the mixing chamber outlet 9 into a cup 5. Since the diluent feeding means 3 are able to work only when the mixing chamber is placed away from the metering device, there is no risk that steam and moisture above generated in the mixing chamber may raise inside the metering device. It is possible to rinse the mixing chamber with a jet of water before the mixing chamber comes back to its dosing position.

Figure 3A:
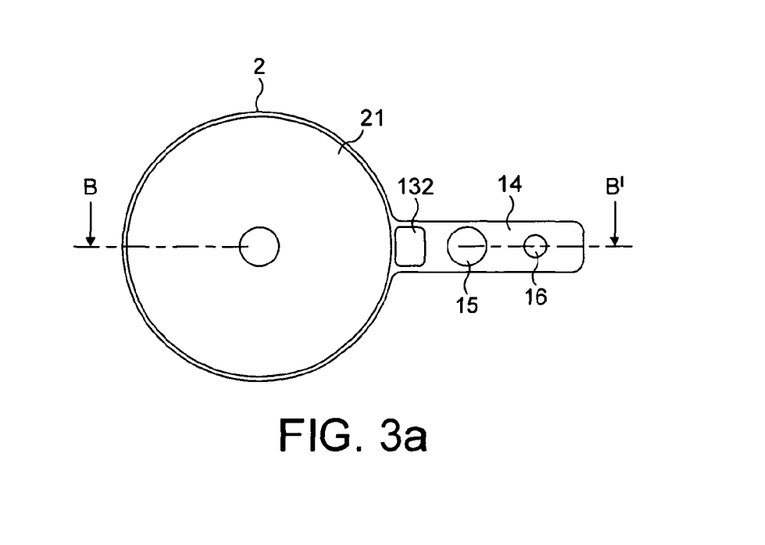
FIG. 3a illustrate the first variant of the first mode of the beverage mixing and dispensing apparatus of the present invention, FIG. 3b corresponds to the vertical section BB' of the mixing chamber.

FIG. 3a is a top view of a mixing chamber 2 that can be used according to the first variant of the first mode of the beverage mixing and dispensing apparatus of the present invention. This mixing chamber 2 presents a top opened extremity 21 used to introducing the soluble ingredient metered by the metering device. The mixing chamber presents a side channel 13 for introducing the diluent inside the mixing chamber. Such a channel 13 can improve the mixing of the soluble ingredient discharged in the bottom of the mixing chamber 2 according to the nature of this soluble ingredient and the orientation and size of said channel outlet 131 inside the mixing chamber 2. The diluent feeding means 3 can be delivered by a pipe at the end of which an o-ring made of a flexible material is fixed for establishing a tight contact with the channel inlet 132. In the mixing position, the mixing chamber 2 is placed so that the channel inlet 132 faces the diluent feeding means 3 and the latter can be vertically movable to lean on the channel inlet 132. The mixing chamber presents in the alignment of the mixing chamber 2 and the channel 13 and extension plate 14 traversed by two holes 15, 16 of different sections. These holes enable the introduction of the diluent in a recipient placed under, for example for frothing a product placed inside the recipient. This frothing step is realised when the mixing chamber 12 is placed in the diluent delivery position, where either hole 15 or hole 16 faces the diluent feeding means 3. The different diameter sizes of the holes 15 and 16 enable the choice between diluent jets of different forces inside the recipient according to the froth quality that is desired. It is for example possible to deliver diluent without any pressure so as just use the feeding means to dilute an ingredient without producing foam.

Figure 3B:
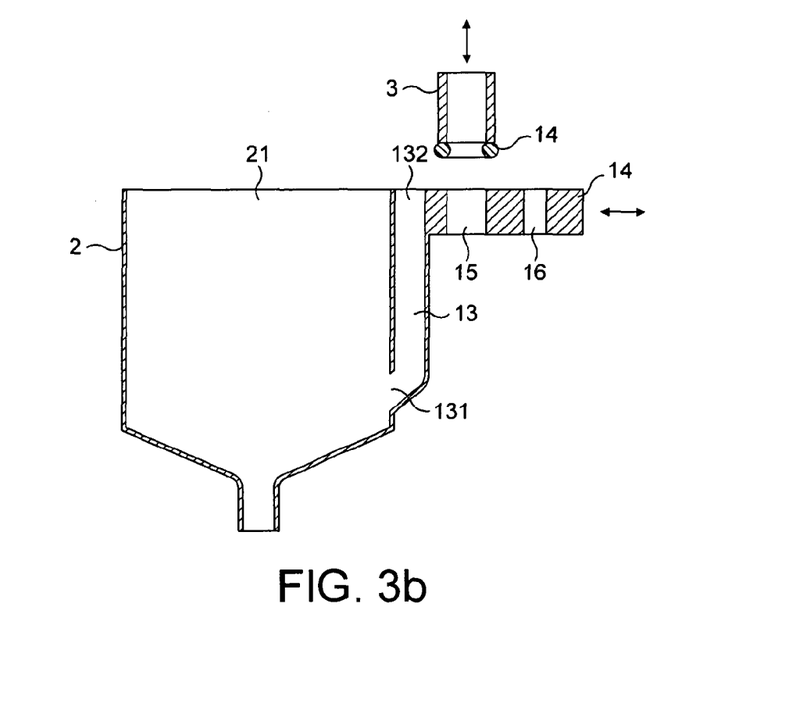
Figure 4A:
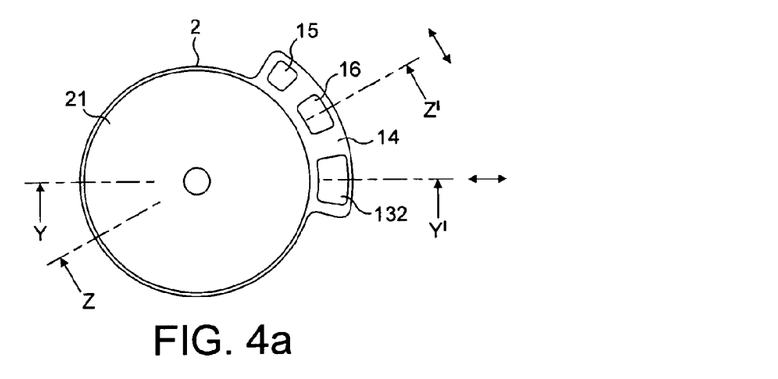
FIG. 4a illustrates the second variant of the first mode of the beverage mixing and dispensing apparatus of the present invention, FIG. 4b corresponds to the vertical section YY' of the mixing chamber.
Figure 4B:
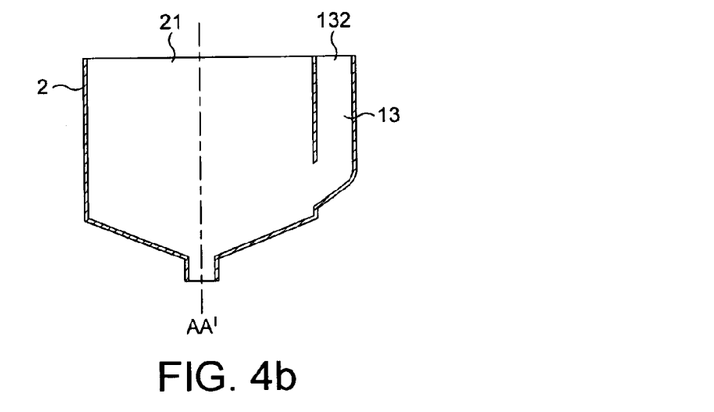
Figure 4C:
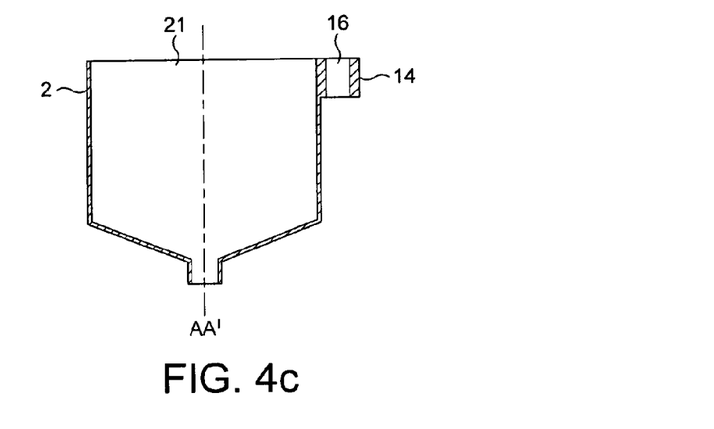
FIG. 4c corresponds to the vertical section ZZ' of the mixing chamber.

FIGS. 4a and 4c illustrate a mixing chamber 2 comprising a channel 13 as in FIGS. 3a and 3b. It presents also an extension 14 pierced by holes 15, 16. Here the extension plate is circular around the mixing chamber wall. Then the mixing chamber is rotated around its axis AA' to reach the desired diluent delivery position in which the diluent feeding means 3 can face the selected hole 16, 15. The rotation enables also to chose between the mixing position where the diluent feeding means can face the channel inlet 132 or the diluent delivery position as explained above.

The invention claimed is:

1. A beverage mixing and dispensing apparatus comprising:
    a metering device,
    a mixing chamber configured for dissolving soluble ingredients in a diluent to form a beverage and comprising at least an upward wall and a bottom wall, the bottom wall comprising a beverage outlet through which the beverage is drained from the mixing chamber,
    at least one diluent feeding means,
    means for moving the mixing chamber, the mixing chamber being movable between a metering position where a metering device outlet emerges into the mixing chamber inlet, and a mixing position where the diluent feeding means can inject the diluent into the mixing chamber and the metering device outlet does not emerge into the mixing chamber inlet.

2. The apparatus of claim 1 comprising means for closing the mixing chamber to the atmosphere in the mixing position.

3. The apparatus of claim 1, wherein the mixing chamber is movable to a delivering position and where the means for closing the mixing chamber to the atmosphere are dissociated from the mixing chamber.

4. The apparatus of claim 1, wherein the mixing chamber is movable between:
    the metering position where the diluent feeding means do not emerge into the mixing chamber inlet, and
    the mixing position where the diluent feeding means emerge into the mixing chamber inlet or in a channel running along the upward wall of the mixing chamber.

5. The apparatus of claim 4, comprising means for closing the mixing chamber to the atmosphere in the mixing position and the means comprise a cover pierced by the diluent feeding means.

6. The apparatus of claim 4, wherein the mixing chamber is movable to at least one diluent delivery position where neither the diluent feeding means nor the metering device outlet emerge into the mixing chamber inlet.

7. The apparatus of claim 1, wherein the mixing chamber comprises:
    a transverse bottom wall and a longitudinal upward wall, and
    at least one diluent inlet in the upward wall.

8. The apparatus of claim 7, comprising:
    a first diluent delivery line connected to the upward wall of the mixing chamber, and
    a second diluent delivery line comprising a nozzle directed toward an area of a receptacle for delivering a frothing diluent volume to the receptacle.

9. A method for producing a liquid beverage in a mixing and dispensing apparatus, the method comprising:
    providing a mixing chamber in a first position, the mixing chamber comprising an upward wall and a bottom wall,
    in the first position, feeding the mixing chamber with soluble ingredient by the means of at least one metering device cooperating with a soluble ingredient source,
    moving the mixing chamber away from the metering device and out of the first position into a second position in which the metering device outlet does not emerge into the mixing chamber inlet,
    in the second position:
    feeding a diluent in the mixing chamber to mix the diluent with the soluble ingredient and dissolve the soluble ingredient into a liquid beverage, and
    draining the liquid beverage from the mixing chamber through a beverage outlet in the bottom wall of the mixing chamber.

10. The method of claim 9, wherein the chamber is moved away from the metering position in a linear path.

11. The method of claim 9, wherein the mixing chamber inlet is closed to the atmosphere during the feeding of diluent inside the mixing chamber.

12. A method for producing a frothed beverage with the apparatus of claim 6, the method comprising:
    moving the mixing chamber to the diluent delivery position,
    placing a receptacle comprising at least a foamable ingredient under the diluent feeding means, and
    feeding a diluent through the diluent feeding means in the receptacle to foam the foamable ingredient.

13. The method of claim 12 comprising:
    moving the mixing chamber to the metering position and feeding the mixing chamber with soluble ingredient delivered by the metering device,
    moving the mixing chamber to the mixing position and feeding the diluent in the mixing chamber to mix the diluent with the soluble ingredient and dissolve the soluble ingredient to form a liquid beverage, and
    stopping the diluent intake inside the mixing chamber and draining the liquid beverage from the mixing chamber into the receptacle containing the foamed foamable ingredient.

14. A method for producing a frothed beverage with the apparatus of claim 8, the method comprising:
    moving the mixing chamber to an intermediate position between the metering and the mixing position,
    placing a receptacle comprising at least a foamable ingredient under the mixing position of the mixing chamber and under the nozzle of the second diluent delivery line, and feeding a diluent through the nozzle of the second diluent delivery line in the receptacle to foam the foamable ingredient.

15. The method of claim 14 comprising:
moving the mixing chamber to the metering position and feeding the mixing chamber with soluble ingredient delivered by the metering device,
moving the mixing chamber to the mixing position and feeding the diluent in the mixing chamber to mix the diluent with the soluble ingredient and dissolve the soluble ingredient into a liquid beverage, and
stopping the diluent intake inside the mixing chamber and draining the liquid beverage from the mixing chamber into the receptacle containing the foamed foamable ingredient.

16. A beverage mixing and dispensing apparatus comprising:
a metering device,
a mixing chamber configured for dissolving soluble ingredients in a diluent to form a beverage and comprising an upward wall and a bottom wall, the bottom wall comprising a beverage outlet through which the beverage is drained from the mixing chamber,
at least one diluent feed, and
the mixing chamber being movable between a metering position where a metering device outlet emerges in the mixing chamber inlet, and a mixing position where the diluent feed can inject the diluent in the mixing chamber and the metering device outlet does not emerge in the mixing chamber inlet.

17. A beverage mixing and dispensing apparatus comprising:
a metering device,
a mixing chamber configured for dissolving soluble ingredients in a diluent to form a beverage and comprising at least an upward wall and a bottom wall, the bottom wall comprising a beverage outlet through which the beverage is drained from the mixing chamber,
at least one diluent feeding means,
means for moving the mixing chamber, the mixing chamber being movable between a metering position where (i) a metering device outlet emerges into the mixing chamber inlet and (ii) the diluent feeding means do not emerge into the mixing chamber inlet, and a mixing position where (i) the diluent feeding means can inject the diluent into the mixing chamber, (ii) the diluent feeding means emerge into the mixing chamber inlet or in a channel running along the upward wall of the mixing chamber, and (iii) the metering device outlet does not emerge into the mixing chamber inlet,
wherein the mixing chamber is movable to at least one diluent delivery position where neither the diluent feeding means nor the metering device outlet emerge into the mixing chamber inlet, and
wherein the mixing chamber comprises an extension plate on its external wall, the plate being pierced by at least a hole and the hole facing the diluent feeding means in a diluent delivery position.

18. The apparatus according to claim 6, wherein the diluent feeding means is configured to dispense the diluent while the mixing chamber is in the diluent delivery position.

* * * * *